US008233921B2

(12) United States Patent
Min et al.

(10) Patent No.: US 8,233,921 B2
(45) Date of Patent: Jul. 31, 2012

(54) METHOD AND SYSTEM FOR TRANSMITTING/RECEIVING DATA IN A COMMUNICATION SYSTEM

(75) Inventors: Poong-Ki Min, Seoul (KR); Sang-Jun Moon, Yongin-si (KR); Sung-Won Lee, Seongnam-si (KR); Dong-Keon Kong, Suwon-si (KR); Dae-Seok Kim, Seoul (KR); Young-Ky Kim, Seoul (KR); Joon-Ho Park, Seongnam-si (KR); Hyeon-Jin Kang, Seoul (KR); Ji-Hye Ha, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1137 days.

(21) Appl. No.: 11/865,166

(22) Filed: Oct. 1, 2007

(65) Prior Publication Data

US 2008/0081644 A1 Apr. 3, 2008

(30) Foreign Application Priority Data

Sep. 30, 2006 (KR) .................. 10-2006-0096688
Apr. 27, 2007 (KR) .................. 10-2007-0041642

(51) Int. Cl.
*H04W 68/00* (2009.01)
(52) U.S. Cl. .................. 455/458; 455/414.1; 455/412.2; 455/466; 455/522.1; 709/202; 709/203; 709/206

(58) Field of Classification Search .................. None
See application file for complete search history.

(56) References Cited

U.S. PATENT DOCUMENTS

| 7,020,480 | B2* | 3/2006 | Coskun et al. ................ 455/466 |
| 2002/0143916 | A1 | 10/2002 | Mendiola et al. |
| 2004/0161080 | A1 | 8/2004 | Digate et al. |
| 2005/0068167 | A1* | 3/2005 | Boyer et al. ................ 340/531 |
| 2006/0009243 | A1 | 1/2006 | Dahan et al. |
| 2006/0167849 | A1 | 7/2006 | Marcus et al. |
| 2006/0168204 | A1* | 7/2006 | Appelman et al. ........... 709/224 |

FOREIGN PATENT DOCUMENTS

| EP | 1 679 846 A1 | 7/2006 |
| JP | 2001-313666 A | 11/2001 |
| KR | 10-2006-0080373 A | 7/2006 |
| WO | 01/67622 A2 | 9/2001 |
| WO | 2005/089146 A2 | 9/2005 |

* cited by examiner

*Primary Examiner* — Pierre-Louis Desir
*Assistant Examiner* — Aung Win
(74) *Attorney, Agent, or Firm* — Jefferson IP Law, LLP

(57) ABSTRACT

A method and system for transmitting/receiving data in a communication system are provided, in which upon generation of IM service data to be transmitted to a second MS, a first MS requests paging to a second MS to an IM server, the IM server transmits a paging message to the second MS in response to the paging request, and the second MS receives the IM service data from the first MS, after receiving the paging message.

21 Claims, 11 Drawing Sheets

METHOD AND SYSTEM FOR TRANSMITTING/RECEIVING DATA IN A COMMUNICATION SYSTEM

PRIORITY

This application claims the benefit under 35 U.S.C. §119 (a) of a Korean Patent Application filed in the Korean Intellectual Property Office on Sep. 30, 2006 and assigned Serial No. 2006-96688, and a Korean Patent Application filed in the Korean Intellectual Property Office on Apr. 27, 2007 and assigned Serial No. 2007-41642, the entire disclosure of both of which are hereby incorporated by reference.

BACKGROUND OF THE INVENTION

1. Field of the Invention

The present invention generally relates to a communication system. More particularly, the present invention relates to a method and system for transmitting/receiving data to provide high-speed communication services to users in a communication system that provides a variety of communication services.

2. Description of the Related Art

Future-generation communication systems are under development in the form of mobile communication systems that provide services capable of high-speed large data transmission/reception to Mobile Stations (MSs).

As the future-generation communication systems are based on the mobility of MSs, the power consumption of the MSs is a significant factor to the whole system. In order to minimize the power consumption of the MSs, an idle mode operation and an active mode operation between the MSs and a Radio Access Station (RAS) functioning as a Base Station (BS) have been proposed. An idle mode was introduced for the purpose of minimized power consumption for an idle period of time in which no transmission occurs due to the absence of transmission data.

In general, when there is no more transmission/reception data during data transmission/reception between an MS and a RAS, the MS transitions from an active mode to an idle mode by de-registration. If a service is generated for the MS in the idle mode, the RAS transmits a paging message, for example, Mobile_Paging-Advertisement (MOB_PAG-ADV) to the MS and both the MS and the RAS enter into the active mode. The MOB_PAG-ADV message is broadcast to all MSs that the RAS can communicate with.

Upon receipt of the MOB_PAG-ADV message, the MS activates the applications of all service types that it supports before receiving data from the RAS because it cannot identify the service type of the data until it actually receives the data. This means that the applications are kept suspended until the MS receives the data. As a consequence, the MS suffers from unnecessary power and memory consumption.

As the MS maintains a radio connection with the RAS, that is, shares resources to be able to receive data of all service types, it also suffers from unnecessary resource consumption. In addition, the MS receives the communication service through an associated application after identifying the service type of the received data, thereby causing a time delay during data transmission/reception between the RAS and the MS.

Another problem with this data transmission/reception mechanism is that there is no specified data transmission/reception scheme for Instant Messaging (IM). Accordingly, there exists a need for a method for transmitting/receiving data in the case where an active-mode MS transmits/receives data to/from an idle-mode MS, that is, when an IM service is provided to users.

SUMMARY OF THE INVENTION

An aspect of exemplary embodiments of the present invention is to address at least the above-mentioned problems and/or disadvantages and to provide at least the advantages described below. Accordingly, an aspect of the present invention is to provide a method for transmitting/receiving data in a communication system.

Another aspect of the present invention is to provide a method and system for transmitting/receiving data to provide an IM service to users in a communication system.

A further aspect of the present invention is to provide a method and system for transmitting/receiving data to provide an IM service to users in a communication system based on a Universal Service Interface (USI) access network.

In accordance with an aspect of the present invention, a method for transmitting/receiving data in a communication system is provided. In the method, upon generation of IM service data to be transmitted to a second MS, a first MS requests paging to a second MS to an IM server, the IM server transmits a paging message to the second MS in response to the paging request, and the second MS receives the IM service data from the first MS, after receiving the paging message.

In accordance with another aspect of the present invention, a system for transmitting/receiving data in a communication system is provided. In the system, a first MS requests paging to a second MS to an IM server, upon generation of IM service data to be transmitted to the second MS, the IM server transmits a paging message to the second MS in response to the paging request, and the second MS receives the IM service data from the first MS, after receiving the paging message.

In accordance with a further aspect of the present invention, a method for receiving an IM service in a first MS in a communication system is provided. In the method, the first MS requests an IM service targeting at a second MS operating in an idle mode to an IM server, and receives an IM service including at least one of a paging function option and an SMS function option from the IM server, if an access network of the first MS supports USI, the paging function option being an option for enabling transmission of a paging request to the idle-mode second MS and the SMS function option being an option for enabling transmission of an SMS message to the idle-mode second MS.

In accordance with still another aspect of the present invention, a method for providing an IM service in an IM server in a communication system is provided. In the method, the IM server receives a request for an IM service targeting at a second MS operating in an idle mode from a first MS, determines whether an access network of the first MS supports USI, and provides an IM service including at least one of a paging function option and an SMS function option to the first MS, if the access network of the first MS supports the USI, the paging function option being an option for enabling transmission of a paging request to the idle-mode second MS and the SMS function option being an option for enabling transmission of an SMS message to the idle-mode second MS.

In accordance with yet another aspect of the present invention, a system for providing an IM service in a communication system is provided. In the system, a first MS requests an IM service targeting at a second MS operating in an idle mode to an IM server, and receives from the IM server an IM service including at least one of a paging function option and an SMS function option, if an access network of the first MS supports USI, the paging function option being an option for enabling transmission of a paging request to the idle-mode second MS and the SMS function option being an option for enabling transmission of an SMS message to the idle-mode second MS.

In accordance with yet a further aspect of the present invention, a system for providing an IM service in a communication system is provided. In the system, an IM server receives a request for an IM service targeting at a second MS operating in an idle mode from a first MS, determines whether an access network of the first MS supports USI, and provides an IM service including at least one of a paging function option and an SMS function option to the first MS, if the access network of the first MS supports the USI, the paging function option being an option for enabling transmission of a paging request to the idle-mode second MS and the SMS function option being an option for enabling transmission of an SMS message to the idle-mode second MS.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a system and method for transmitting/receiving data between a receiver that provides a communication service to its user by data transmission/reception, for example, an MS and a RAS acting as a BS in a communication system.

Figure 1:
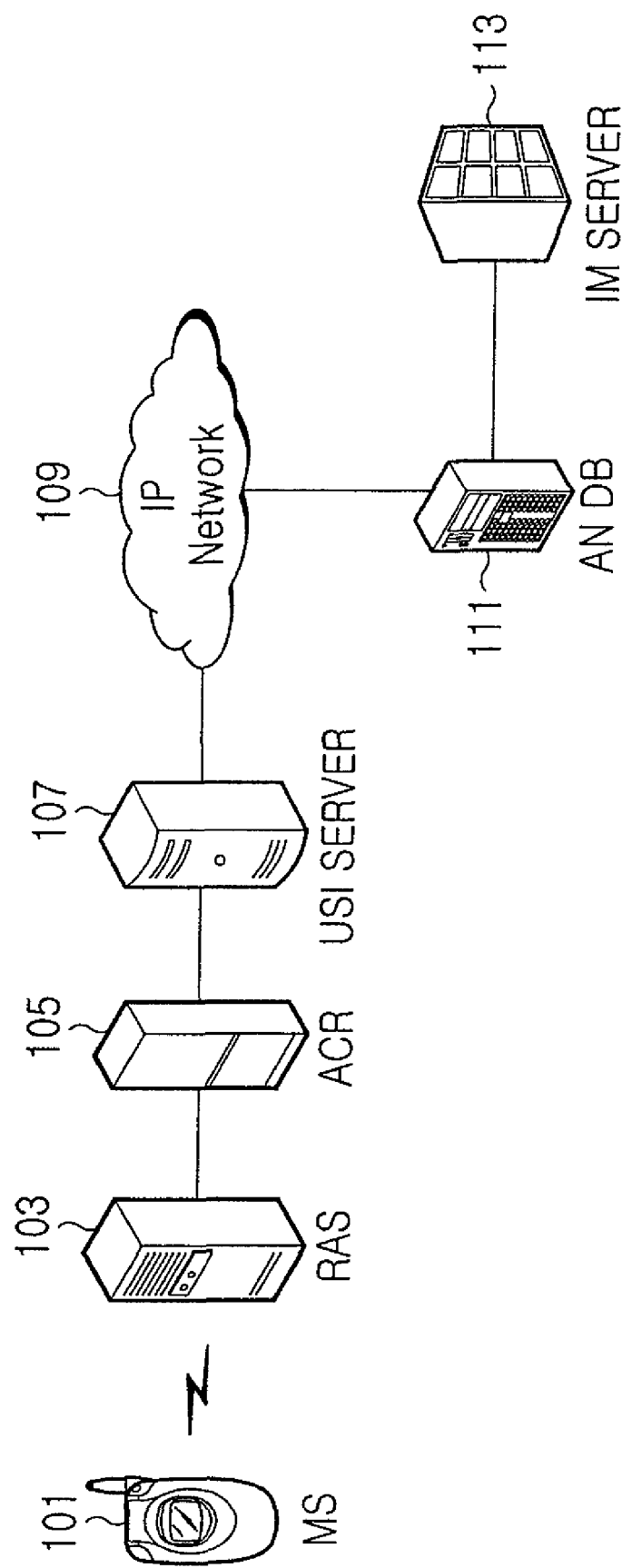
FIG. 1 illustrates a configuration of a communication system according to an exemplary embodiment of the present invention.

FIG. 1 illustrates a configuration of a communication system according to an exemplary embodiment of the present invention.

Referring to FIG. 1, the communication system includes an MS 101, a RAS 103 for transmitting/receiving data to/from the MS 101, an Access Control Router (ACR) 105 for controlling the RAS 103, a USI server 107 for providing a USI, an Access Network DataBase (AN DB) 111 connected to the USI server 107 via an Internet Protocol (IP) network 109 by IP, and an IM server 113 for providing an IM service to the MS 101.

The RAS 103 handles a radio access standard with the MS 101 connected to the communication system, performs an initialization procedure for data transmission/reception, and transmits/receives data to/from the MS 101. That is, the RAS 103 performs Radio Frequency (RF) signal processing, PHYsical (PHY)-layer functions, and Medium Access Control (MAC)-layer functions. It also performs scheduling and ranging with the MS 101. The RAS 103 initializes a cell that it covers and transmits system information to the MS 101. When the MS 101 moves between sectors in the cell, the RAS 103 controls the inter-sector handover.

The ACR 105 controls the RAS 103. A single ACR may control a plurality of RASs. The ACR 105 provides a communication service to the MS 101 connected to the communication system. For this purpose, the ACR 105 performs authentication, MAC protocol processing, IP address allocation, and routing for the MS 101. More specifically, the ACR 105 performs functions in a MAC layer above the MAC layer that the RAS 103 handles, controls handover between RASs and an operation mode between the MS 101 and the RAS 103, and acts as a proxy for authentication, billing, and account management for the MS 101.

The USI server 107 provides the USI to the MS 101 through the ACR 105. The USI server 107 also determines in interaction with the AN DB 111 whether the MS 101 supports the USI by determining whether the MS 101 is connected to a USI-supporting network or a non-USI-supporting network, and provides the USI to the MS 101 according to the determination.

Figure 2:
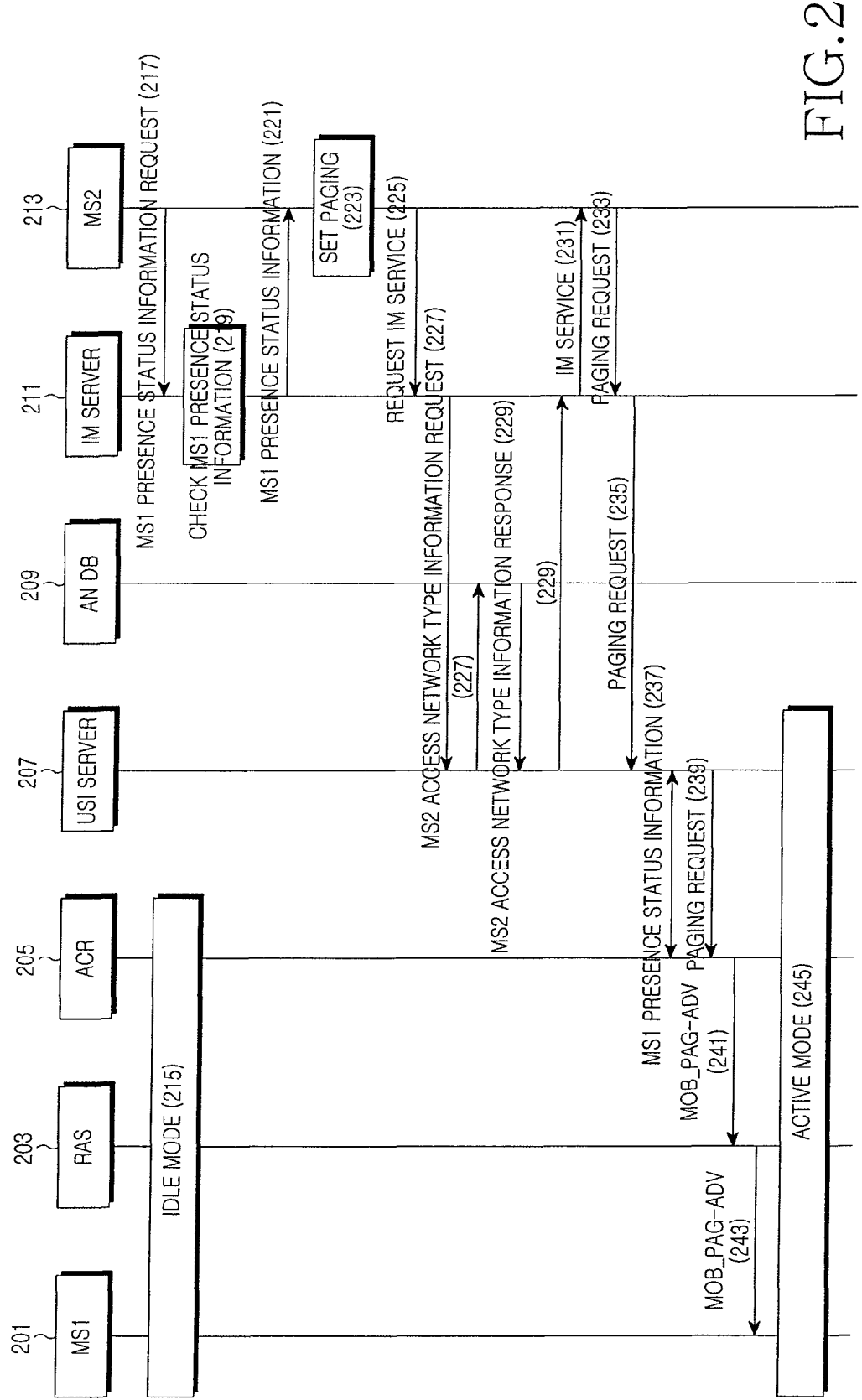
FIG. 2 is a diagram illustrating a signal flow for providing an IM service in a communication system according to an exemplary embodiment of the present invention.

FIG. 2 is a diagram illustrating a signal flow for providing an IM service in the communication system according to an exemplary embodiment of the present invention. In the illustrated case of FIG. 2, a first MS 201 (MS1) operates in an idle mode and a second MS 213 (MS2) operates in an active mode. MS2 requests transmission/reception of IM service data to MS1.

Referring to FIG. 2, the communication system for the IM service includes MS1 201, a RAS 203, an ACR 205, a USI server 207, an AN DB 209, an IM server 211 and MS2 213. MS2 213 operating in the active mode requests presence status information of MS1 201 to the IM server 211 in order to transmit/receive IM service data to/from MS1 201 in step 217. The presence status information includes information about the communication connection mode or the operation mode of MS1 201. The IM server 211 checks the presence status information of MS1 201 in step 219 and transmits the presence status information to MS2 in step 221. It is assumed herein that MS1 201 is operating in the idle mode without a connection to the IM server 211, i.e. in off-line status in step 215.

Upon receipt of the presence status information of MS1 201, MS2 213 sets paging for data transmission/reception to/from MS1 201 in step 223 and requests the IM service with MS1 201 to the IM server 211 in step 225. The IM server 211 queries the AN DB 209 about the type of the access network of MS2 213 via the USI server 207 in step 227. The query about the type of the access network is a query as to whether the access network supports USI.

The AN DB 209 determines whether MS2 213 supports the USI using an IP address of MS2 213 and notifies the IM server 211 of the determination result by an access network type information response via the USI server 207 in step 229. The determination as to whether MS2 213 supports the USI is made by determining whether the access network of MS2 213 supports the USI.

In step 231, the IM server 211 provides a different IM service depending on whether MS2 213 supports the USI. For example, if MS2 213 supports the USI, MS2 213 receives an IM service in which it can request paging to MS1 201 operating in the idle mode or transmit a Short Message Service (SMS) message. In contrast, if MS2 213 does not support the USI, MS2 213 receives an IM service in which it can chat with MS1 201 or transmit an SMS message to MS1 201 only when MS1 201 operates in the active mode. As MS1 201 is operating in the idle mode, it is assumed herein that MS2 213 supports the USI. Thus, MS2 213 receives the IM service in which it can request paging to MS1 201 or transmit an SMS message to MS1 201.

In step 233, MS2 213 requests paging to MS1 201 to the IM server 211. The IM server 211 transmits a paging request to the USI server 207 in step 235. The paging from MS2 213 to MS1 201 may include an ALERT service. The ALERT service is a service that transmits a message to MS1 201 in log-out status, thus prompting MS1 201 to log in.

The USI server 207 determines that MS1 201 operates in the idle mode by sharing the presence status information of MS1 201 with the ACR 205 in step 237 and requests the IM service to the ACR 205 in step 239.

In step 241, the ACR 205 transmits to the RAS 203 a MOB_PAG-ADV message with information about the type of IM service data to be transmitted to MS1 201. The RAS 203 forwards the MOB_PAG-ADV message to MS1 201 in step 243. MS1 201 transitions from the idle mode to the active mode by activating an IM service application corresponding to the type of the IM service data in step 245. In accordance with an exemplary embodiment of the present invention, the MOB_PAG-ADV message includes the information about the type of the IM service data to be transmitted to MS1 201 in a Type, Length, Value (TLV) Encoded Information field or a Reserved field, as illustrated in Table 1.

Table 1 below illustrates the format of the MOB_PAG-ADV message and a description of each field is not provided herein.

TABLE 1

| Syntax | Size (bits) | Notes |
| --- | --- | --- |
| MOB_PAG-ADY_Message_format(){ | | |
| Management Message Types=62 | 8 | |
| Num_Paging_Group_IDs | 8 | Number of Paging Group IDs in this message |
| For (i=0;i< Num_Paging_Group_IDs;i++) { | | |
| Paging Group ID | 8 | |
| } | | |
| Num_MACs | 8 | Number of MS MAC addresses |
| For (j=0;j< Num_MACs;j++) { | | |
| MS MAC Address hash | 24 | The hash is obtained by computing a CRC 24 on the MS 48-bit MAC address. The polynomial for the calculation is 0x1864CFB. |
| Action Code | 2 | Paging action instruction to MS<br>0b00 = No Action Required<br>0b01 = Perform Ranging to establish location and acknowledge message<br>0b10 = Enter Network<br>0b11 = reserved |
| Reserved | 6 | |
| } | | |
| padding | variable | Padding bits to ensure octet aligned |
| TLV Encoded Information | variable | TLV specific |
| } | | |

Now a description will be made of transmission/reception of IM service data between MS1 and MS2 that operate in an active mode in the communication system according to an exemplary embodiment of the present invention with reference to FIGS. 3A and 3B.

Figure 3A:
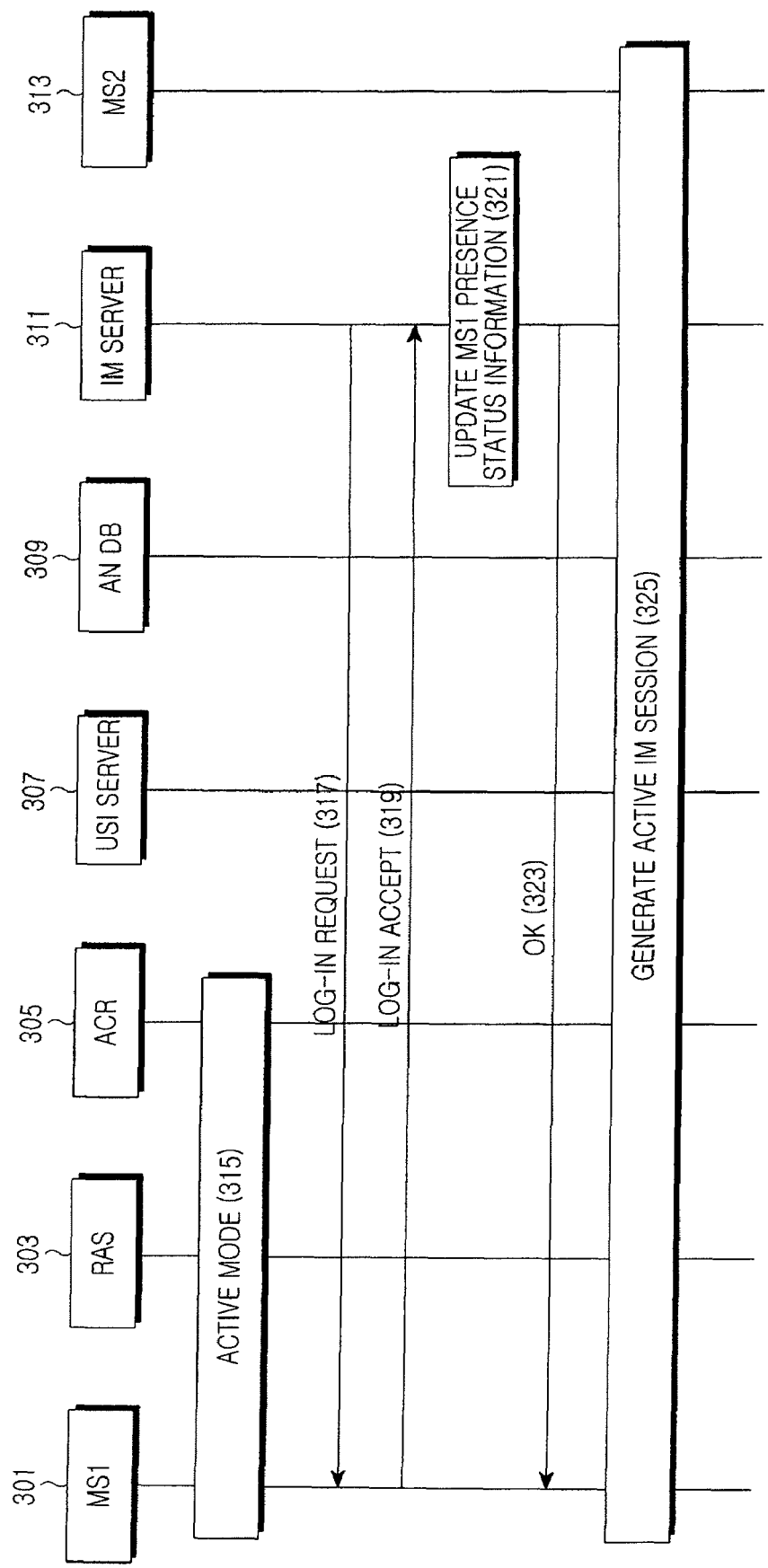
FIG. 3A is a diagram illustrating a signal flow for generating an active IM session between a first MS (MS1) and a second MS (MS2) that operate in an active mode in a communication system according to an exemplary embodiment of the present invention.

FIG. 3A is a diagram illustrating a signal flow for generating an active IM session between a first MS 301 (MS1) and a second MS 313 (MS2) that operate in an active mode in the communication system according to an exemplary embodiment of the present invention.

Referring to FIG. 3A, MS1 301 is operating in the active mode in step 315. An IM server 311 requests MS1 301 to log in to the IM server 311 so that MS1 301 can exchange IM service data with MS2 313 in step 317. As MS1 301 has already activated an IM service application by receiving a MOB_PAG-ADV message as described with reference to FIG. 2, MS1 301 accepts the log-in request, that is, logs in to the IM server 311 by the IM service application in step 319.

The IM server 311 updates the presence status information of MS1 301 that has logged in to the IM server 311 in step 321 and notifies MS1 301 of the presence information update in step 323. As an active IM session is created between MS1 301 and MS2 313 in step 325, IM service data is transmitted between MS1 301 and MS2 313.

Figure 3B:
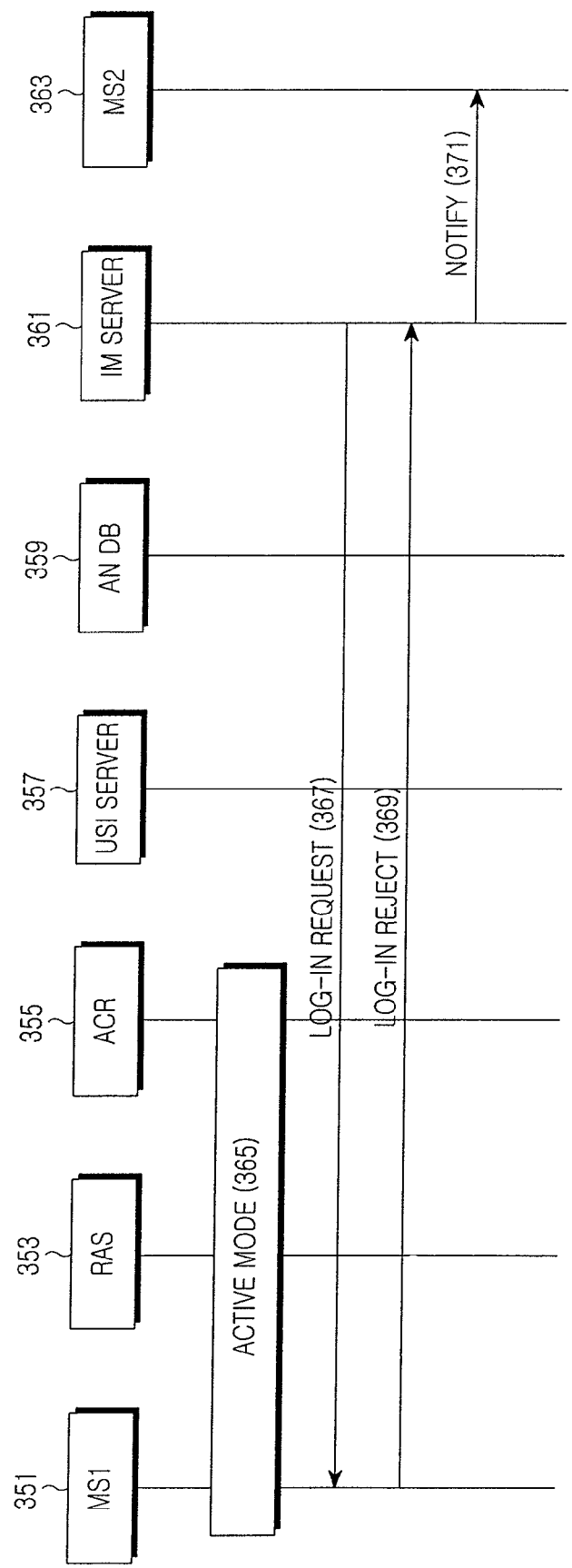
FIG. 3B is a diagram illustrating a signal flow associated with failure of an active IM session between MS1 and MS2 that operate in the active mode in a communication system according to an exemplary embodiment of the present invention.

With reference to FIG. 3B, a description will be made of the case where MS1 operating in active mode rejects an IM service data transmission/reception request of MS2, unlike the case illustrated in FIG. 3A.

FIG. 3B is a diagram illustrating a signal flow associated with failure of an active IM session between a first MS 351

(MS1) and a second MS 363 (MS2) that operate in the active mode in the communication system according to an exemplary embodiment of the present invention.

Referring to FIG. 3B, MS1 351 is operating in the active mode in step 365. An IM server 361 requests MS1 351 to log in to the IM server 361 so that MS1 351 can exchange IM service data with MS2 363 in step 367. If MS1 351 does not want the IM service data transmission/reception to/from MS2 363, it rejects the log-in request in step 369.

The IM server 361 notifies MS2 363 that paging is not available, that is, the IM service data transmission/reception is not available in step 371.

Figure 4:
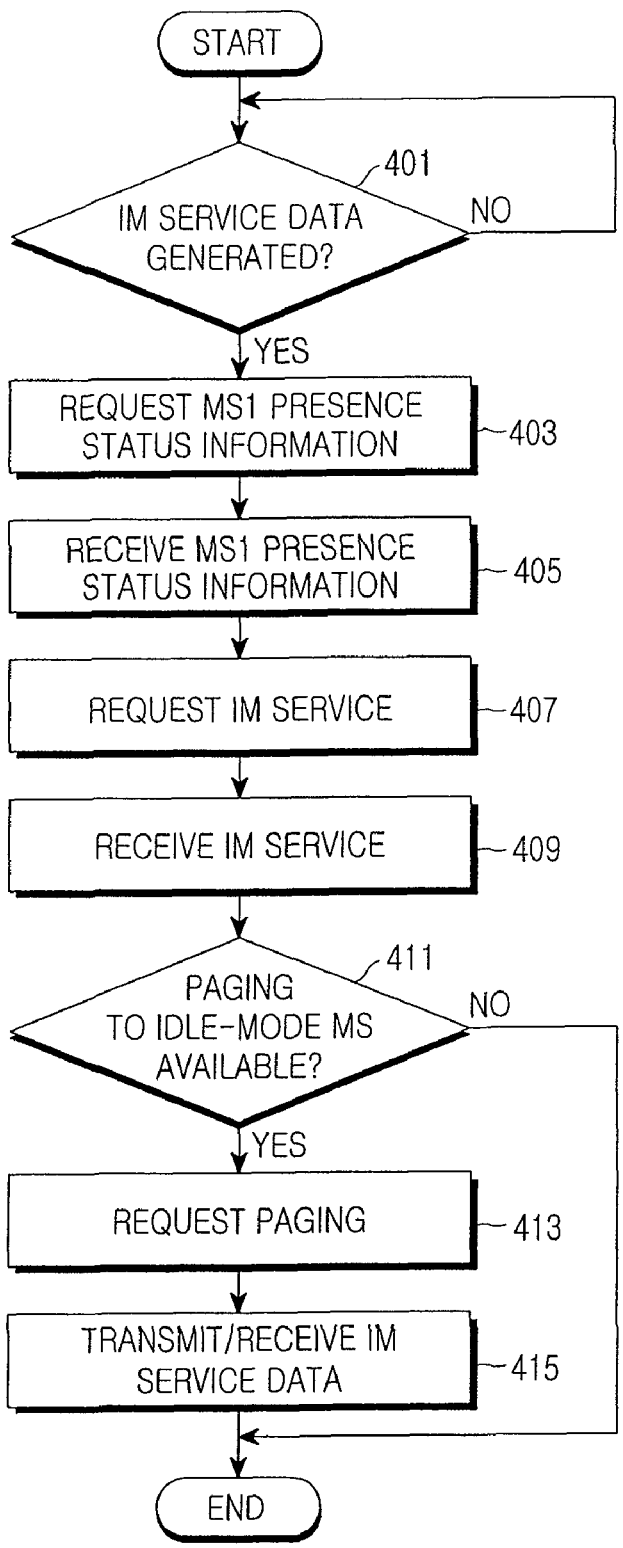
FIG. 4 is a flowchart of an operation of an MS in a communication system according to an exemplary embodiment of the present invention.

With reference to FIG. 4, an operation for paging from MS2 to MS1 and transmitting IM service data between them in the communication system according to an exemplary embodiment of the present invention will be described below.

FIG. 4 is a flowchart of an operation of an MS in the communication system according to an exemplary embodiment of the present invention.

Referring to FIG. 4, MS2 monitors generation of IM service data to transmit to MS1 in step 401. Upon generation of the IM service data, MS2 requests the presence status information of MS1 to the IM server in step 403. MS2 receives the presence status information of MS1 in step 405 and requests an IM service to the IM server in step 407.

In step 409, MS2 receives the IM service from the IM server. MS2 determines whether it can request paging to an idle-mode MS, i.e. a log-out MS by an interface of the IM service in step 411. If the paging request to the log-out MS is possible, MS2 requests paging to the log-out MS, i.e. MS1 to the IM server in step 413 and exchanges IM service data with MS1 in step 415.

An operation of the IM server so as to enable transmission of IM service data between MS1 and MS2 in the communication system according to an exemplary embodiment of the present invention will be described with reference to FIGS. 5A and 5B.

Figure 5A:
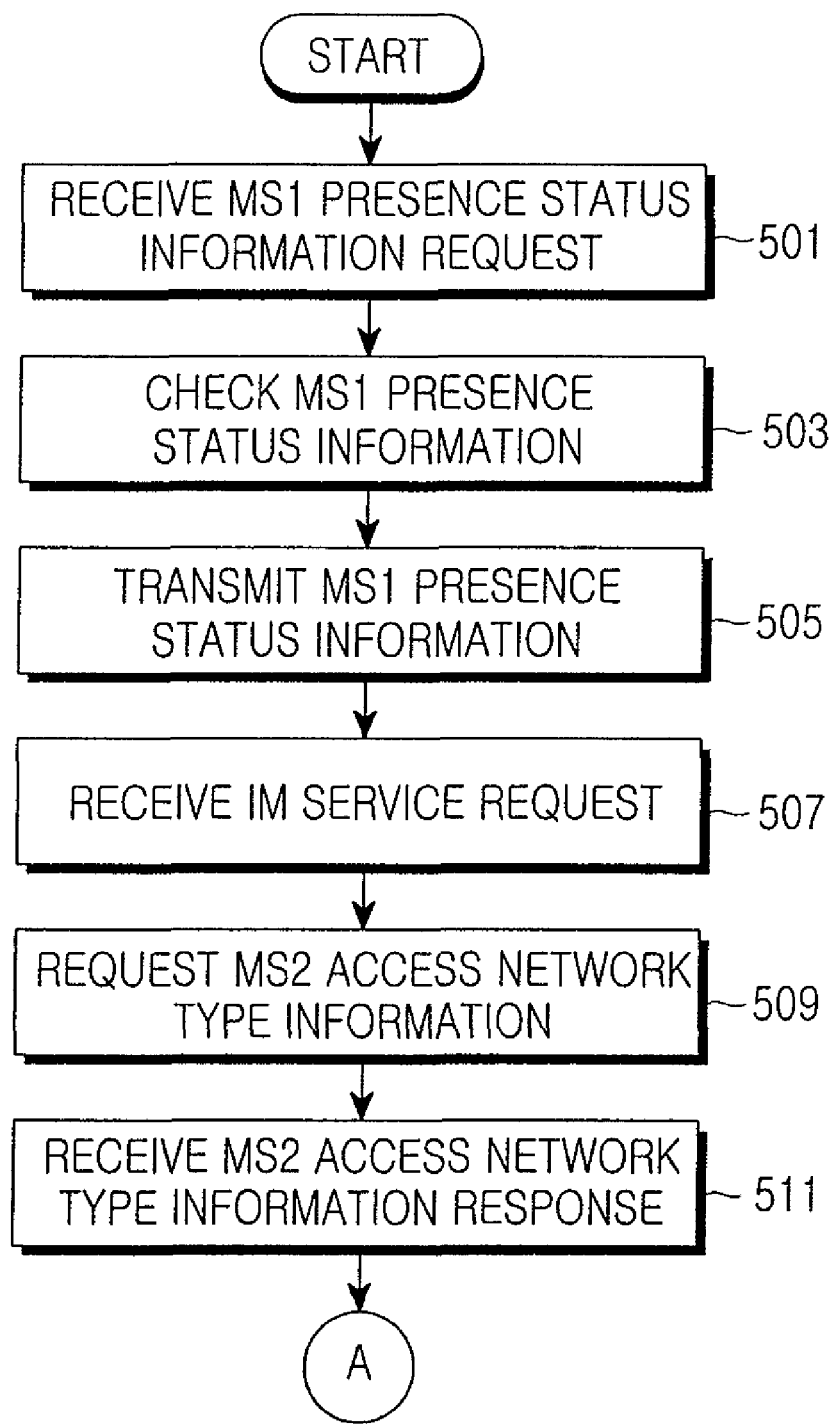
FIGS. 5A and 5B are flowcharts of an operation of an IM server in a communication system according to an exemplary embodiment of the present invention.
Figure 5B:
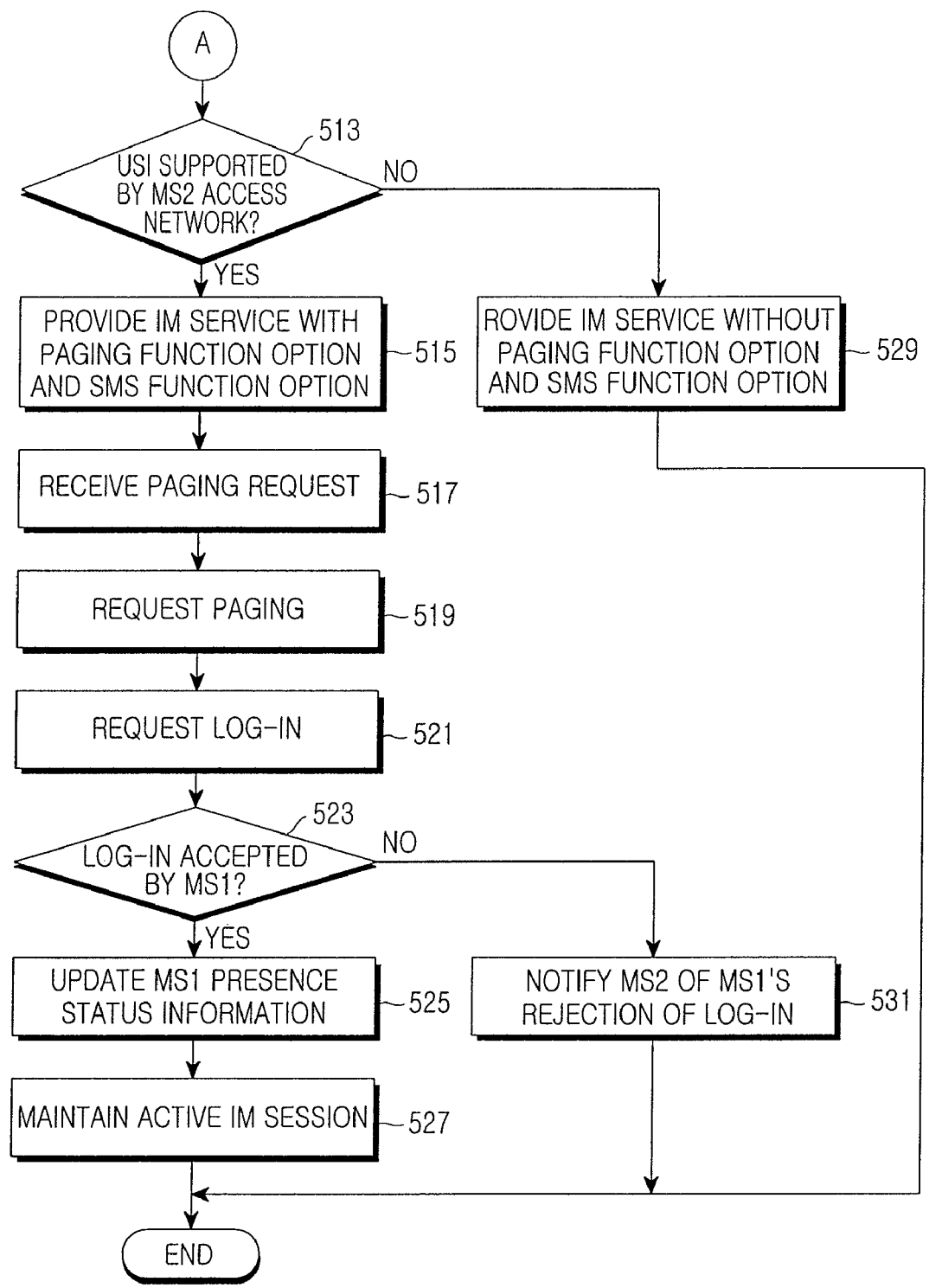

FIGS. 5A and 5B are flowcharts of an operation of the IM server in the communication system according to an exemplary embodiment of the present invention.

Referring to FIGS. 5A and 5B, upon receipt of a request for the presence status information of MS1 from MS2 in step 501, the IM server checks the presence status information of MS1 in step 503 and transmits it to MS2 in step 505. When receiving an IM service request from MS2 in step 507, the IM server queries the AN DB about the type of an access network of MS2 through the USI server in order to determine whether MS2 supports USI in step 509.

The IM server receives an access network type information response from the AN DB in step 511 and determines whether the access network of MS2 supports the USI based on the access network type information response in step 513. If the access network of MS2 supports the USI, the IM server proceeds to step 515, considering that MS2 supports the USI. If the access network of MS2 does not support the USI, the IM server proceeds to step 529, considering that MS2 does not support the USI.

In step 529, the IM server provides an IM service that enables communication with a log-in MS to MS2. This IM service includes a chatting service and an SMS service, for example.

In step 515, the IM server provides an IM service that enables communication with a log-in MS and a log-out to MS2. An IM service for a log-out MS includes a paging service and an SMS service, for example. The IM server receives a paging request from MS2 in step 517 and forwards the paging request in step 519.

In step 521, the IM server requests MS1 that has transitioned to the active mode to log in. The IM server monitors whether MS1 accepts the log-in request in step 523. If MS1 has accepted the log-in request, the IM server updates the presence status information of MS1 in step 525 and maintains an active IM session in step 527 so that MS1 and MS2 transmit IM service data with each other.

In contrast, if MS1 has rejected the log-in request in step 523, the IM server notifies MS2 of the rejection in step 531.

While the log-in request precedes the paging request from MS2 to MS1 in the illustrated case of FIG. 5, it can be further contemplated that MS2 can request the paging and the log-in simultaneously by including an ALERT service in the paging.

Figure 6A:
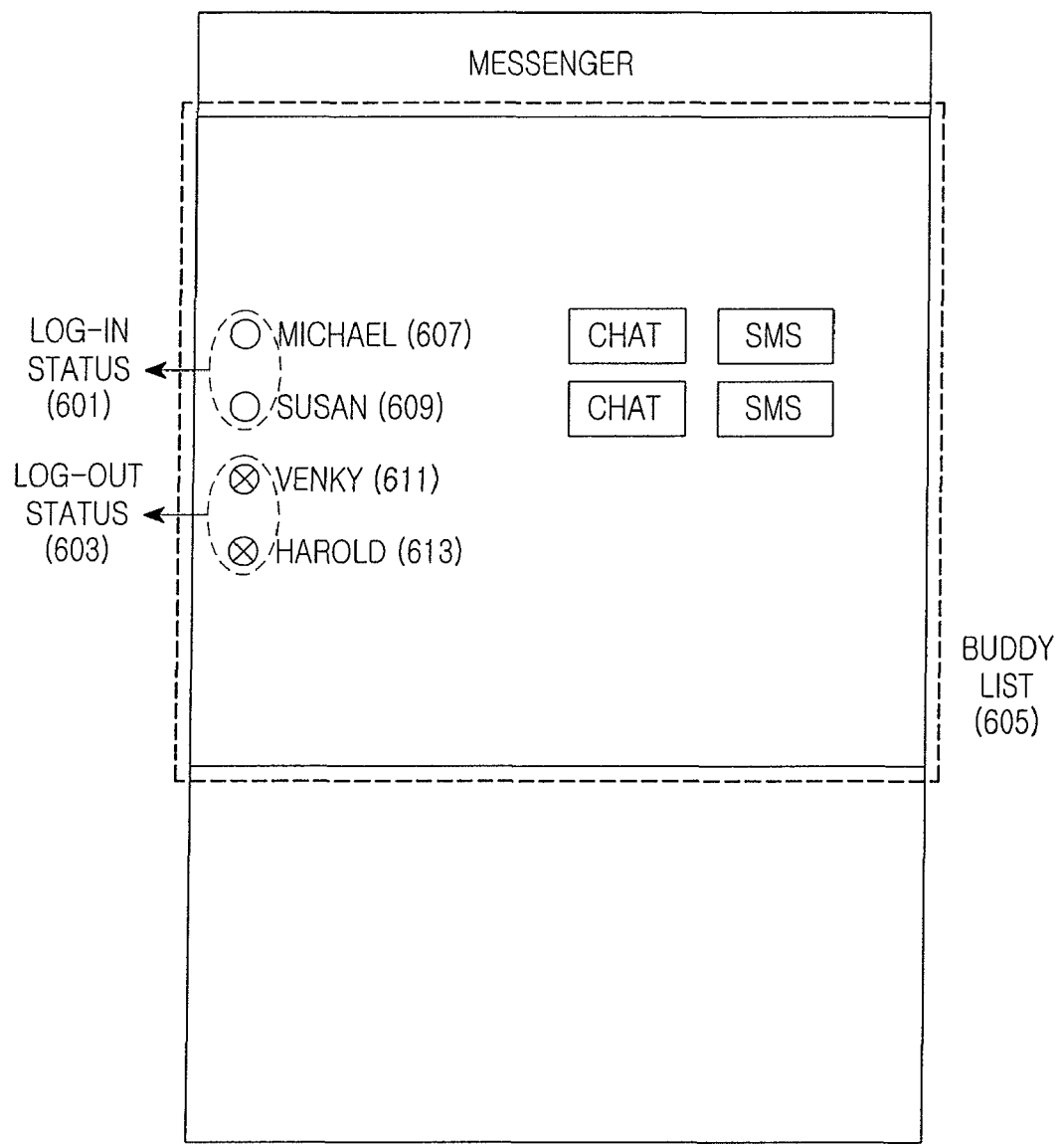
FIG. 6A illustrates an interface for providing the IM service to an MS that does not support a USI by the IM server in a communication system according to an exemplary embodiment of the present invention.

FIG. 6A illustrates an interface for providing an IM service to an MS that does not support a USI by the IM server in the communication system according to an exemplary embodiment of the present invention.

Referring to FIG. 6A, when MS2 requests the IM service to the IM server, the IM server provides MS2 with an IM service interface including a buddy list 605. The buddy list 605 indicates whether users to communicate with MS2 by the IM service are in log-in status 601 or in log-out status 603. MS2 requests chatting or transmits an SMS message to log-in users, such as MICHAEL 607 and SUSAN 609 by means of a button.

Figure 6B:
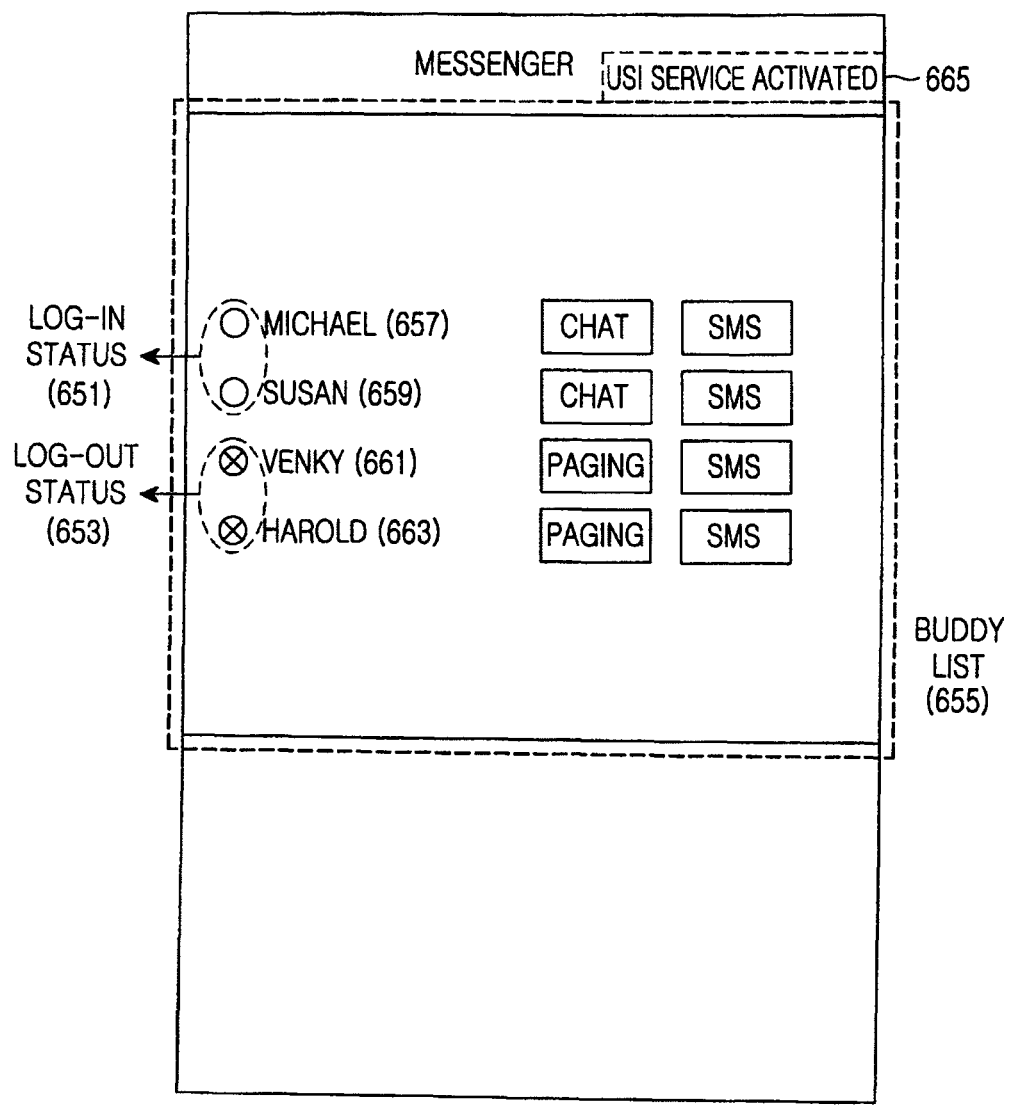
FIG. 6B illustrates an interface for providing the IM service to an MS that supports the USI by the IM server in a communication system according to an exemplary embodiment of the present invention.

FIG. 6B illustrates an interface for providing an IM service to an MS that supports the USI by the IM server in the communication system according to an exemplary embodiment of the present invention.

Referring to FIG. 6B, when MS2 requests the IM service to the IM server, the IM server provides MS2 with an IM service interface including a buddy list 655. The buddy list 655 indicates whether users to communicate with MS2 by the IM service are in log-in status 651 or in log-out status 653. MS2 requests chatting or transmits an SMS message to log-in users, such as MICHAEL 657 and SUSAN 659, and or requests paging or transmits an SMS message to log-out users such as VENKY 661 and HAROLD 663, by means of a button.

To distinguish from the interface for the case where MS2 does not support USI illustrated in FIG. 6A, the interface illustrated in FIG. 6B is labeled with USI service activated 665.

Figure 7:
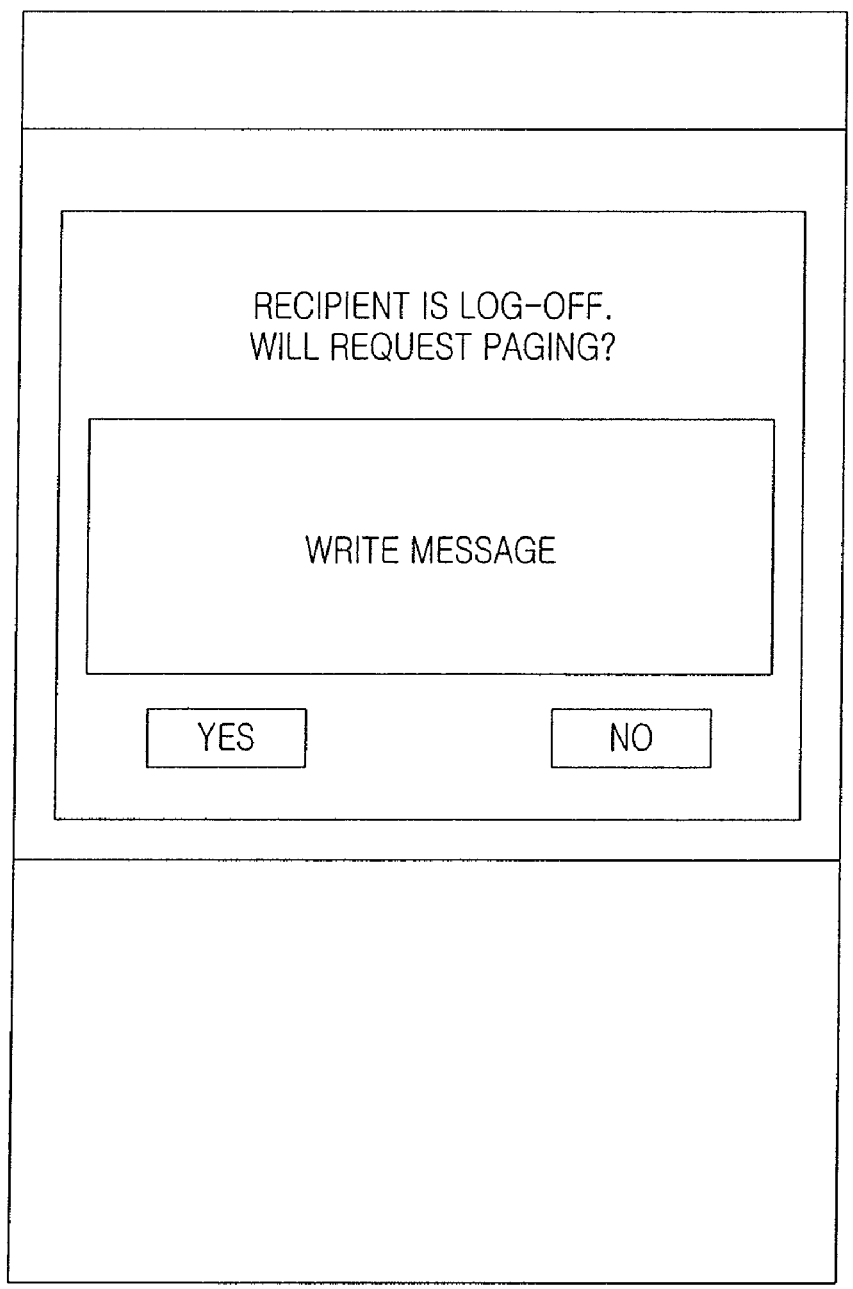
FIG. 7 illustrates a paging request that MS2 transmits to the IM server, for data transmission/reception to and from MS1 in a communication system according to an exemplary embodiment of the present invention.

FIG. 7 illustrates a paging request that MS2 transmits to the IM server, for data transmission/reception to and from MS1 in the communication system according to an exemplary embodiment of the present invention.

Referring to FIG. 7, MS2 requests paging to MS1 to the IM server so that MS1 transitions from an idle mode to an active mode, that is, MS1 activates an IM service application for transmission/reception of IM service data. MS1 issues the paging request by a button, for example, "YES". When requesting the paging, a user of MS2 can also input a message. If the user does not enter a message in a message input area, a preset default message is transmitted along with the paging request.

Figure 8:
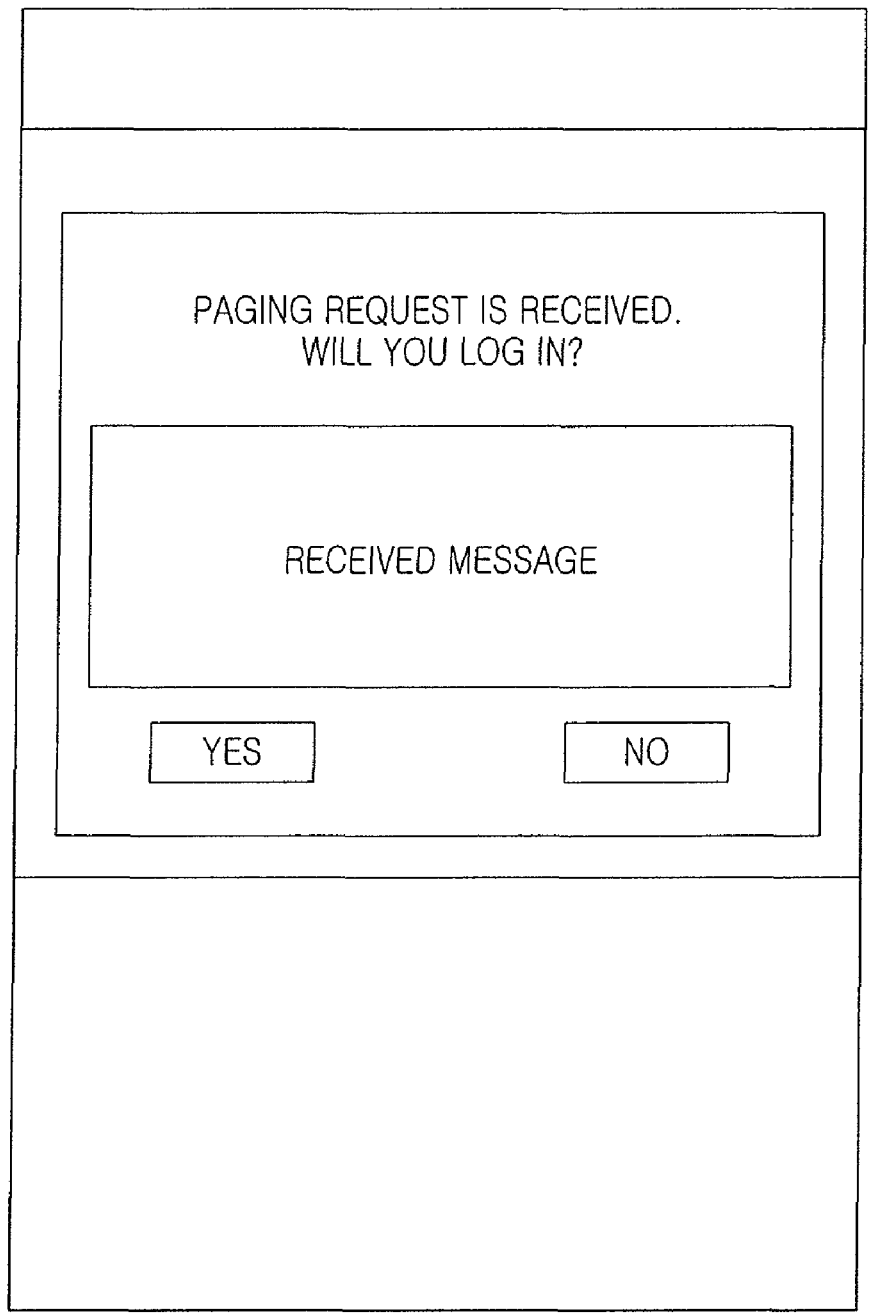
FIG. 8 illustrates an access to the IM server that MS1 makes after receiving the paging request in a communication system according to an exemplary embodiment of the present invention.

FIG. 8 illustrates an access to the IM server that MS1 makes after receiving the paging request in the communication system according to an exemplary embodiment of the present invention.

Referring to FIG. 8, when MS1 receives the paging request and activates the IM service application, a user of MS1 is prompted to accept or reject log-in by a preset button.

As is apparent from the above description, the present invention enables even a log-out user to receive an IM service by wireless paging. Since it is determined whether a user supports a USI using information about the access network of the user and a different IM service is provided to a user according to the determination, a user-friendlier interface is provided to the user.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for transmitting/receiving data in a communication system, the method comprising:
   requesting paging to a second Mobile Station (MS) via an Instant Messaging (IM) server by a first MS, upon generation of IM service data to be transmitted to the second MS, wherein the paging comprises an alert service for prompting the second MS to log-in;
   transmitting a paging message to the second MS in response to the paging request by the IM server;
   receiving the IM service data from the first MS, after receiving the paging message by the second MS; and
   activating an IM service application beforehand by the second MS based on a type of the IM service data, upon receipt of the paging message,
   wherein the paging message comprises information about the type of the IM service data to be transmitted to the second MS, a first information field for indicating a number of MS Medium Access Control (MAC) addresses and a second information field for indicating a paging action instruction to each MS according to the number of MS MAC addresses.

2. The method of claim 1, wherein the first MS operates in an active mode and the second MS operates in an idle mode.

3. The method of claim 1, wherein the requesting of the paging via the IM server comprises:
   requesting presence status information of the second MS via the IM server by the first MS, upon generation of the IM service data; and
   receiving the presence status information of the second MS from the IM server and requesting paging to the second MS via the IM server in accordance with the presence status information of the second MS by the first MS.

4. The method of claim 3, wherein the presence status information of the second MS comprises information about an operation mode of the second MS.

5. The method of claim 1, wherein the paging comprises an alert service for prompting the second MS to log-in by transmitting a message from the first MS to the second MS.

6. The method of claim 1, wherein the receiving of the IM service data comprises logging in to the IM server, receiving the IM service data and maintaining an active session with the first MS by the second MS.

7. The method of claim 6, further comprising updating the presence status information of the second MS by the IM server, when the second MS logs in to the IM server.

8. The method of claim 1, further comprising receiving a log-in request from the IM server by the second MS, upon receipt of the paging message.

9. A system for transmitting/receiving data in a communication system, the system comprising:
   a first Mobile Station (MS) for requesting paging to a second MS via an Instant Messaging (IM) server, upon generation of IM service data to be transmitted to the second MS;
   the IM server for transmitting a paging message to the second MS in response to the paging request; and
   the second MS for activating an IM service application beforehand based on a type of the IM service data, upon receipt of the paging message, and for receiving the IM service data from the first MS, after receiving the paging message,
   wherein the paging message comprises information about the type of the IM service data to be transmitted to the second MS, a first information field for indicating a number of MS Medium Access Control (MAC) addresses and a second information field for indicating a paging action instruction to each MS according to the number of MS MAC addresses.

10. The system of claim 9, wherein the first MS operates in an active mode and the second MS operates in an idle mode.

11. The system of claim 9, wherein the requesting of the paging via the IM server, upon generation of the IM service data, the first MS requests presence status information of the second MS to the IM server, receives the presence status information of the second MS from the IM server, and requests paging to the second MS via the IM server in accordance with the presence status information of the second MS.

12. The system of claim 11, wherein the presence status information of the second MS comprises information about an operation mode of the second MS.

13. The system of claim 9, wherein the alert service for prompting the second MS to log-in is performed by transmitting a message from the first MS to the second MS.

14. The system of claim 9, wherein the second MS logs in to the IM server and receives the IM service data, maintaining an active session with the first MS.

15. The system of claim 14, wherein the IM server updates the presence status information of the second MS by the IM server, when the second MS logs in to the IM server.

16. The system of claim 9, wherein the second MS receives a log-in request from the IM server, upon receipt of the paging message.

17. A method for receiving an Instant Messaging (IM) service in a first Mobile Station (MS) in a communication system, the method comprising:
   requesting an IM service targeting at a second MS operating in an idle mode to an IM server;
   receiving an IM service including at least one of a paging function option and a Short Message Service (SMS) function option from the IM server, if an access network of the first MS supports Universal Service Interface (USI), the paging function option being an option for enabling transmission of a paging request to the idle-mode second MS and the SMS function option being an option for enabling transmission of an SMS message to the idle-mode second MS; and
   upon receipt of the IM service at the first MS, transferring a paging request to the IM server causing the IM service to transmit a paging message to the second MS,
   wherein the second MS activates an IM service application beforehand based on a type of the IM service data, upon receipt of the paging message, and
   wherein the paging message comprises information about the type of the IM service data to be transmitted to the second MS, a first information field for indicating a number of MS Medium Access Control (MAC) addresses and a second information field for indicating a paging action instruction to each MS according to the number of MS MAC addresses.

18. The method of claim 17, further comprising receiving an IM service without the paging function option and the SMS function option from the IM server, if the access network of the first MS does not support the USI.

19. A method for providing an Instant Messaging (IM) service in an IM server in a communication system, the method comprising:

receiving a request for an IM service targeting at a second Mobile Station (MS) operating in an idle mode from a first MS;

determining whether an access network of the first MS supports Universal Service Interface (USI);

providing an IM service including at least one of a paging function option and a Short Message Service (SMS) function option to the first MS, if the access network of the first MS supports the USI, the paging function option being an option for enabling transmission of a paging request to the idle-mode second MS and the SMS function option being an option for enabling transmission of an SMS message to the idle-mode second MS; and upon receipt of a paging request from the first MS, transmitting a paging message to the second MS in response to the paging request by the IM server, wherein the second MS activates an IM service application beforehand based on a type of the IM service data, upon receipt of the paging message, and wherein the paging message comprises information about the type of the IM service data to be transmitted to the second MS, a first information field for indicating a number of MS Medium Access Control (MAC) addresses and a second information field for indicating a paging action instruction to each MS according to the number of MS MAC addresses.

20. The method of claim 19, further comprising providing an IM service without the paging function option and the SMS function option to the first MS, if the access network of the first MS does not support the USI.

21. The method of claim 19, wherein the determining of whether the access network of the first MS supports USI comprises determining whether the access network of the first MS supports USI using an Internet Protocol (IP) address of the first MS.

\* \* \* \* \*